G. W. Harlan,

Brick Machine.

No 102,115. Patented Apr. 19. 1870.

Attest.
William Blakeney
E. E. Wood

Inventor.
Geo. W. Harlan

United States Patent Office.

GEORGE W. HARLAN, OF CINCINNATI, OHIO.

Letters Patent No. 102,115, dated April 19, 1870.

IMPROVEMENT IN BRICK-MACHINES.

The Schedule referred to in these Letters Patent and making part of the same.

I, GEORGE W. HARLAN, of Cincinnati, in the county of Hamilton and State of Ohio, have invented a new and useful Improvement in the Manufacture of Brick and in Brick-Machines, of which the following is a specification.

Nature and Object of Invention.

My invention consists in the process of tempering, mixing, and molding, brick, tile, &c., whereby I am enabled to moisten and temper the clay to the proper consistency for molding by using a sufficient amount of hot steam to raise the clay or pulp to a high degree of uniform heat, and at the same time to moisten the clay sufficiently to be easily mixed by proper machinery, and, without material loss of heat and of moisture, to pass the mixed pulp immediately into molds; the retained heat, being thoroughly infused throughout every particle of the molded brick, secures a uniformity of temperature and enables the brick to be cured rapidly by additional heat or by slow cooling, free from inherent strains, leaving the brick perfect in shape, without cracks or checks.

The second part of my invention consists in combining a steam-tight mixing and a molding-box, the molding-box being directly attached to the mixing-box, so that the pulp and steam can quickly and easily pass from the one to the other, and, by means of rotating blades, be passed directly into molds, which are caused to pass close to the molding-box upon an endless apron, and so close as to receive the proper shape while in a highly-heated state without loss of heat and moisture necessary in making brick which will dry rapidly with little moisture, leaving the brick perfect in shape.

Description of the Accompanying Drawings.

General Description.

A is the tempering or mixing-box, and is provided with a hopper, B, and steam-pipe, H, and should be substantially made to resist the vibrations of the working parts.

The box A has one or more horizontal shafts, $a$, each provided with a continual series of spiral-shaped blades or wings, similar in construction to an ordinary conveying-shaft. These shafts are supported upon proper bearings at either end of the box.

Figure 2:
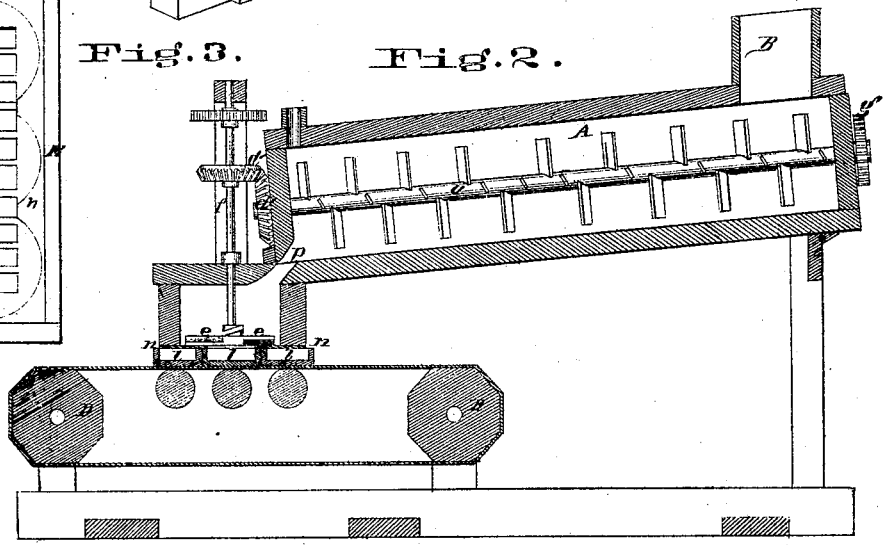
Figure 2 is a longitudinal vertical section of fig. 1.

When three shafts are used, the middle shaft projects through the bearing at the hopper end of the box sufficiently for a spur or gear-wheel, $g$, to be attached, (see fig. 2,) for a driving-gear to fit and mesh into, to propel or operate the entire machine.

At the opposite end of the box A this shaft $a$ projects through sufficiently to attach a bevel gear-wheel, $d'$, which meshes into a corresponding one, $d'$, upon the upright shaft $f$.

The molding-box E is attached to the mixing-box A, which is also made steam-tight.

Upon the under side a passage, P, is made for the pulp or prepared clay to pass from the mixing to the molding-box.

Vertical shafts $i$ $i$ and $f$ work in suitable bearings, one upon the upright frame near the top of the mixing-box, and the other upon a cross-piece on the same frame above the molding-box. The nature of the molding-box E is such that the bearings should be outside and above it. These vertical shafts $i$ $i$ and $f$ project into the molding-box and terminate near the bottom, (see fig. 2.)

Upon the lower end are placed spiral blades or wings $e$ $e$.

The gear-wheels $d$ $d$ $d$ secure a uniform motion of the shafts and blades.

Figure 1:
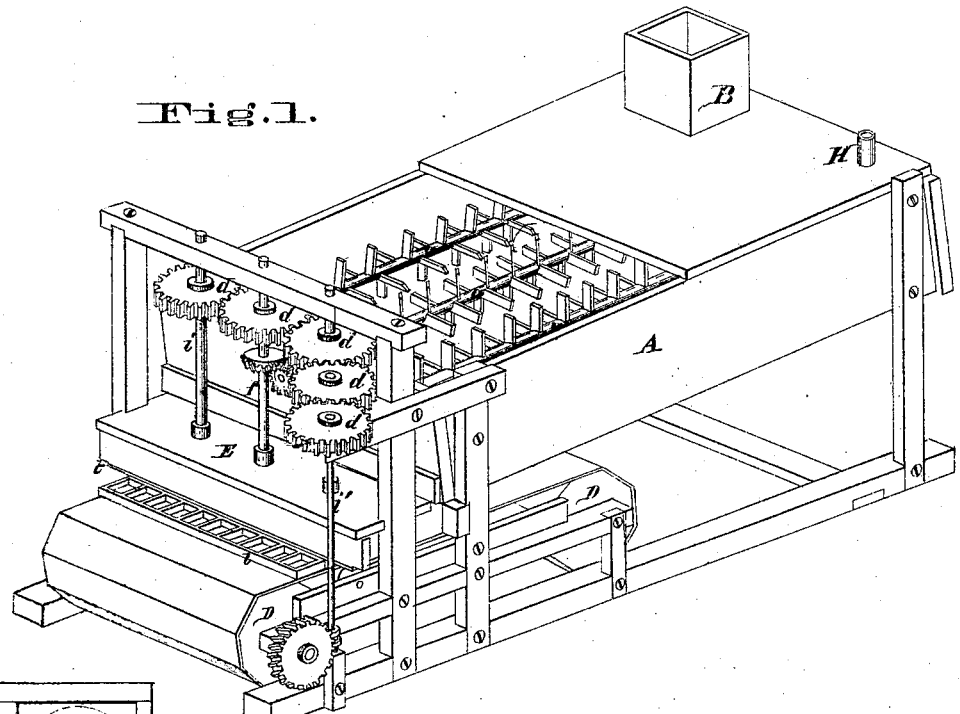
Figure 1 is a perspective view of the entire machine.
Figure 3:
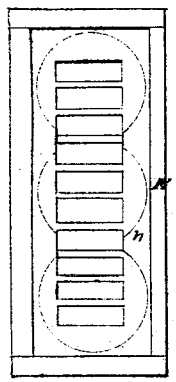
Figure 3 is a top view of the bottom plate of the molding-box.

These blades $e$ $e$ revolve close to the bottom plate $n$ of the molding-box E, and force the clay through apertures of the plate $n$, see fig. 3, and cut or strike the clay as the mold immediately beneath it is filled.

D D are revolving drums, which are revolved by shaft $i$ and its gearing.

Around these drums is secured an endless apron, which carries the molds close under the bottom of the molding-box E or plate $n$. This plate $n$ should be a thin metallic plate, with apertures of the size and shape of the molds, (see fig. 3,) and placed flush upon the bottom of the box E.

The clay is forced through the apertures in plate $n$ till the mold immediately beneath is filled. The blades $e$ strike or cut the clay above the top of the molds the thickness of plate $n$.

Plate $t$ is placed upon the outer bottom side of plate $n$, and should be made of thin metal, slightly beveled. As the molds $l$ are carried forward under this plate it completes the striking and levels the brick even with the top of the molds.

The drums D D are octagon in shape, each side being of the width of the molds $l$. The apron should be made of jointed slats of the same width, each slat carrying one mold at each one-eighth revolution of drum D.

The speed of the various shafts and mill may be varied at will. I use for the shafts $a$, $i$, and $i'$ ten revolutions per minute, and the drums D one-half of a revolution per minute.

An exhaust-pipe may be used for the escape of superfluous steam which has not been mixed and taken up in the clay, and should be fixed either in the molding-box or at the same end of the mixing-box.

My method of tempering, mixing, and molding brick, &c., is as follows:

Suitable power, usually steam, is applied to operate the machine. Clay is introduced into the hopper B by positive regular feed, suitably adapted to prevent the escape of the steam and bring it into contact with the clay upon the under side in the hopper B, which is softened and falls into the mixing-box.

Steam, either exhaust, direct, or superheated, is admitted into the mixing-box through pipe H, and should be at least of as high temperature as exhaust steam, as it softens and tempers the clay when of a high heat more rapidly, and, with much less moisture, renders the clay sufficiently plastic for grinding or mixing.

The speed of the shafts $u$ and blades should be regulated to allow the clay to be passed rapidly forward to the molding-box, and, by the time it arrives at the molding-box E, will be ready for molding.

The mixing-box A should be steam-tight, and the high degree of heat from the steam permeating every particle of clay or pulp, heats the clay and enables it to be molded without pressure, the steam alone furnishing sufficient moisture without the addition of water.

Exhaust steam of fifteen pounds pressure is sufficient to expel the air and temper the clay, raising it to a uniform degree of heat, and sufficiently moist to be easily and rapidly carried by the blade $e\ e$ of the molding-box directly into the mold underneath the aperture of plate $n\ n$.

The blades $e\ e$ pass so close to the plate $n$ of the molding-box as to strike the clay when the molds are filled the thickness of the plate $n$ only from the top of the molds.

Plate $t$ of the molding-box E, as the molds are passed forward, presses slightly and smooths the clay even with the top of the molds, and completes the striking or molding of the brick.

The exhaust-pipe should escape the steam not taken up by the clay before molding.

The molds $l$ should pass so close to plate $n\ n$ as to prevent the access of air to the clay or escape of the steam and moisture in the prepared pulp.

A table may be placed on a level with the forward drum D, to receive the molds, as the revolution of the drums carry the molds forward on the apron.

Bricks thus molded are more thoroughly and uniformly tempered, and, being molded in a highly-heated state, are treated much more rapidly and with less moisture than in any other process known. The inherent heat of the molded brick assists in expelling the moisture. They also dry more uniformly and much quicker than when made by hand or by other machines.

The temperature of the brick being uniform, unequal contraction is avoided in the drying, and the bricks are free from cracks or warps due to inherent strain. To effect this more completely I prepare an oven which may be heated by the escape steam passed by suitable pipes through the same or by the heat from the boiler-furnace. This oven should be of uniform temperature, and the brick, as soon as molded, deposited on a suitable truck, passed from the molds directly into the oven, where, in a few hours, they will be sufficiently dried to be put into the kiln for burning, saving the time of drying in the yard, and the expense of turning and handling, &c., incidental.

By the above steam-heated process, brick, &c., can be made at all seasons of the year, irrespective of weather.

The small amount of space occupied by the machine and oven enables the manufacture to be carried on in any ordinary building or sheds which can be connected to the kiln.

By this process, brick, tile, &c., can be molded and dried much faster, and with a saving of at least one-third of the labor necessary to make hand brick. At the same time more perfect and uniform brick are produced.

Having thus fully described my invention,

What I claim as new, and desire to secure by Letters Patent, is—

A machine for the manufacture of brick, consisting of mixing-box A, shafts $a\ a'$, molding-box E, and shafts with blades $e\ e$ and molds $l\ l$, constructed and arranged to employ steam to temper and mix the clay and to mold the brick, substantially as herein set forth.

GEO. W. HARLAN.

Witnesses:
E. E. WOOD,
WILLIAM BLAKNEY.